(12) United States Patent
Cudak et al.

(10) Patent No.: US 9,158,459 B2
(45) Date of Patent: Oct. 13, 2015

(54) MANAGING A STORAGE DEVICE USING A HYBRID CONTROLLER

(75) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 488 days.

(21) Appl. No.: 13/412,088

(22) Filed: Mar. 5, 2012

(65) Prior Publication Data

US 2013/0232376 A1 Sep. 5, 2013

(51) Int. Cl.
*G06F 3/06* (2006.01)

(52) U.S. Cl.
CPC .......... *G06F 3/0607* (2013.01); *G06F 3/0661* (2013.01); *G06F 3/0679* (2013.01)

(58) Field of Classification Search
CPC .......... G06F 12/0246; G06F 12/0868; G06F 3/0679; G06F 3/0611; G06F 2212/214
USPC ....................................... 714/5.11
See application file for complete search history.

(56) References Cited

U.S. PATENT DOCUMENTS

| | | | |
|---|---|---|---|
| 7,353,302 B2 | 4/2008 | Seto | |
| 7,673,080 B1 | 3/2010 | Yu et al. | |
| 8,296,487 B1* | 10/2012 | Yoon et al. | 710/74 |
| 2003/0229748 A1 | 12/2003 | Brewer et al. | |
| 2005/0027900 A1 | 2/2005 | Pettey | |
| 2008/0077763 A1 | 3/2008 | Steinmetz et al. | |
| 2008/0162755 A1 | 7/2008 | Minami | |
| 2008/0189465 A1 | 8/2008 | Yang | |
| 2010/0229050 A1* | 9/2010 | Konno | 714/49 |
| 2011/0202707 A1 | 8/2011 | Moon et al. | |
| 2011/0239009 A1 | 9/2011 | Noda | |
| 2011/0296088 A1* | 12/2011 | Duzly et al. | 711/103 |

FOREIGN PATENT DOCUMENTS

| | | |
|---|---|---|
| CN | 201828901 U | 5/2011 |
| CN | 201918609 U | 8/2011 |
| CN | 202041958 U | 11/2011 |
| CN | 102902489 A | 1/2013 |
| KR | 10-0922635 B1 | 10/2009 |

OTHER PUBLICATIONS

Patents Act 1977: Search Report under Section 17, IPO Application No. GB1302920.2, Aug. 27, 2013, pp. 1-4.

(Continued)

*Primary Examiner* — Jigar Patel
(74) *Attorney, Agent, or Firm* — Edward J. Lenart; Katherine S. Brown; Kennedy Lenart Spraggins LLP

(57) ABSTRACT

Methods, apparatuses, and computer program products for managing a storage device using a hybrid controller are provided where the storage device comprises an internal peripheral component interconnect express (PCIe) interface to control solid state memory within the storage device. In particular embodiments, the storage device includes a first external interface configured to establish an external PCIe link and a second external interface configured to establish at least one of an external serial attached small computer system interface (SAS) link and an external serial advanced technology attachment (SATA) link. Embodiments include receiving from an external source, by the hybrid controller, a first command at the first external interface and a second command at the second external interface; and concurrently implementing, by the hybrid controller, the first command using a PCIe protocol and the second command using one of a SAS protocol and a SATA protocol.

10 Claims, 5 Drawing Sheets

OTHER PUBLICATIONS

Ling, et al., "An FPGA-based Optical IOH Architecture for Embedded System", 19th Annual International Symposium on Field-Programmable Custom Computing Machines (FCCM), May 1-3, 2011, pp. 85-88, Digital Object Identifier: 10.1109/FCCM.2011.24, IEEE, USA.

"OCZ Technology", www.wikipedia.org [online], 2012, 2 pp., [accessed online Jan. 31, 2012], URL: http://en.wikipedia.org/wiki/OCZ_Technology.

"Evolving SATA for High-Speed Storage", www.sata-io.org [online], Aug. 2011, 12 pp., [accessed online Mar. 5, 2012], URL: http://www.sata-io.org/documents/SATA-Express-Briefing-Presentation_Final.pdf.

\* cited by examiner

MANAGING A STORAGE DEVICE USING A HYBRID CONTROLLER

BACKGROUND OF THE INVENTION

1. Field of the Invention

The field of the invention is data processing, or, more specifically, methods, apparatuses, and computer program products for managing a storage device using a hybrid controller.

2. Description of Related Art

Peripheral component interconnect express (PCIe) devices based on solid state memory are gaining popularity. PCIe is a protocol not designed with storage applications in mind and as a result, lacks some of the management and service features provided by other protocols, such as SAS and SATA.

SUMMARY OF THE INVENTION

Methods, apparatuses, and computer program products for managing a storage device using a hybrid controller are provided where the storage device comprises an internal peripheral component interconnect express (PCIe) interface to control solid state memory within the storage device. In particular embodiments, the storage device includes a first external interface configured to establish an external PCIe link and a second external interface configured to establish at least one of an external serial attached small computer system interface (SAS) link and an external serial advanced technology attachment (SATA) link. Embodiments include receiving from an external source, by the hybrid controller, a first command at the first external interface and a second command at the second external interface; and concurrently implementing, by the hybrid controller, the first command using a PCIe protocol and the second command using one of a SAS protocol and a SATA protocol.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
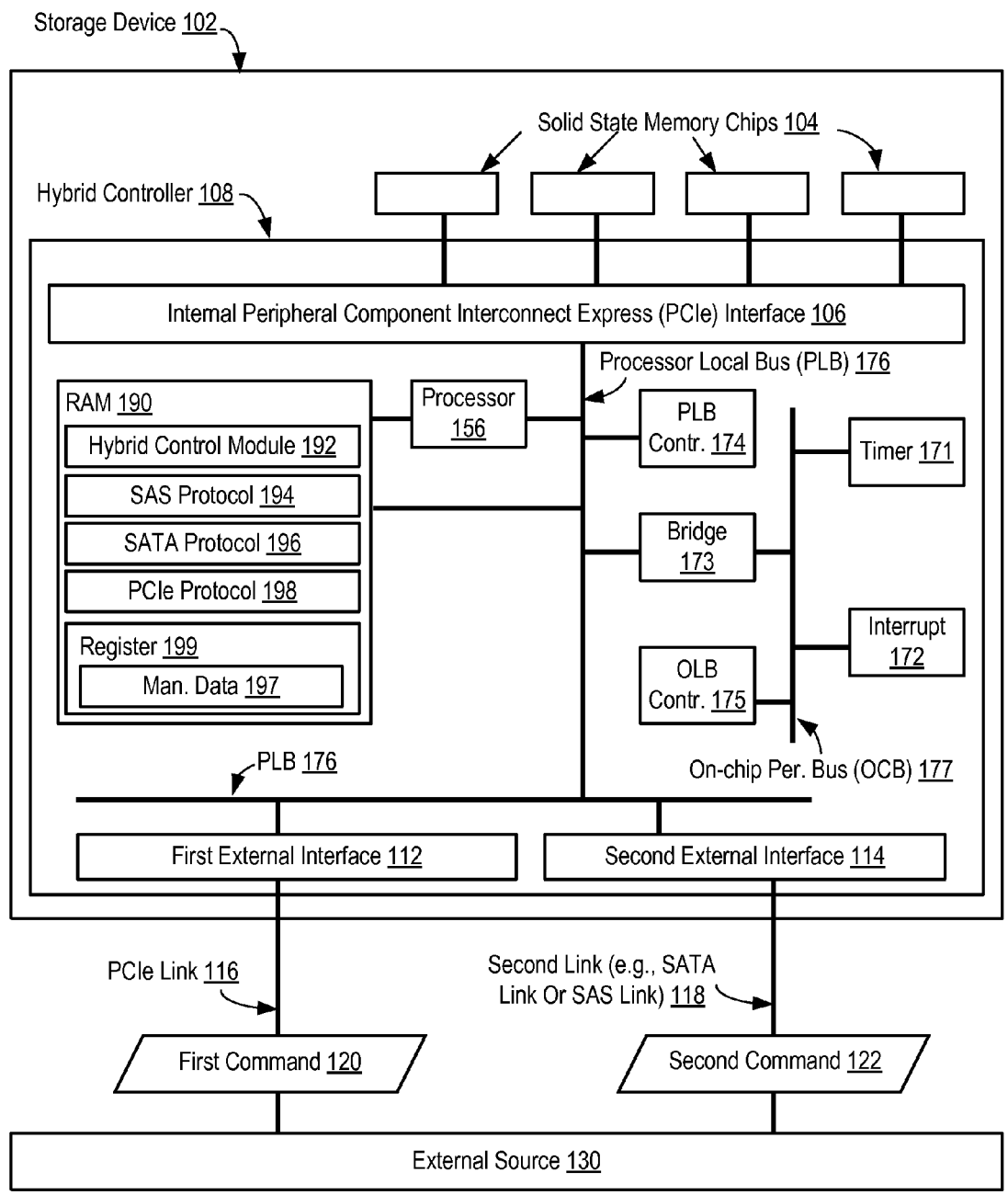
FIG. 1 sets forth a diagram of a storage device that includes a hybrid controller comprising automated computing machinery useful in managing the storage device according to embodiments of the present invention.

Exemplary methods, apparatuses, and computer program products for managing a storage device using a hybrid controller in accordance with the present invention are described with reference to the accompanying drawings, beginning with FIG. 1. Managing a storage device using a hybrid controller in accordance with the present invention is generally implemented with computers, that is, with automated computing machinery. FIG. 1 sets forth a diagram of a system that includes a storage device (102) containing a hybrid controller (108) comprising automated computing machinery useful in managing the storage device (102) according to embodiments of the present invention. In a particular embodiment, the system of FIG. 1 is part of a computer.

In the example of FIG. 1, the hybrid controller (108) facilitates access to solid state memory chips (104) located within the storage device (102). A solid state memory chip may include non-volatile or volatile memory components for storage of data. Examples of solid state memory devices include NAND-based flash memory and DRAM volatile memory. The hybrid controller (108) includes at least one processor (156) as well as random access memory (RAM) (190), both of which are connected to a processor local bus (PLB) (176). A PLB is a high performance bus that provides high-bandwidth low-latency connections between the high performance peripherals of a storage device, the processor (156), and the RAM (190). Access to the PLB (176) is controlled by a PLB controller (174). Examples of high performance peripherals include an internal peripheral component interconnect express (PCIe) interface (106), the first external interface (112), and the second external interface (114).

An internal PCIe interface includes pathways coupling the solid state memory chips (104) to the other components of the hybrid controller (108) via the PLB (176). Pathways of the internals PCIe interface are configured to translate data between a PCIe protocol (198) and a PLB protocol for communication between the hybrid controller (108) and the solid state memory chips (104). A PCIe protocol is a standard indicating details for implementing a computer expansion bus. In the example of FIG. 1, the first external interface (112) is also a PCIe interface and is used to translate data between the PCIe protocol (198) and the PLB protocol for communication between an external source (130) and the hybrid controller (108). The second external interface (114) is a secondary bus interface for translating data between the PLB protocol and a secondary bus protocol, such as a SAS protocol (194) and a SATA protocol (196). A SAS protocol and a SATA protocol are both standards indicating details for implementing a computer bus and computer bus interface. That is, the hybrid controller (108) of FIG. 1 includes at least two distinct external interfaces for communicating with the external source (130). An external source may be any component of a computing system, such as a processor.

In the example of FIG. 1, the hybrid controller (108) also includes an on-chip peripheral bus (OPB) for lower performance peripheral components, such as a timer (171) and an interrupt controller (172). Access to the OCB (177) is controlled by an OLB controller (175). A bridge (173) is provided between the PLB (176) and the OCB (177) to enable data transfer between the components of the PLB (176) and the OCB (177). The components of the hybrid controller (108) are for example only. In accordance with embodiments of the present invention, a hybrid controller may include additional peripheral components, alternative bus and peripheral connections, and additional buses (e.g., a device control register (DCR) bus).

Stored in RAM (190) is a hybrid control module (192) that is used for managing the storage device according to embodiments of the present invention. The hybrid control module (192) includes computer program instructions that when executed by the processor (156) cause the hybrid controller (108) to perform common memory controller functions on data corresponding to the solid state memory chips (104). Examples of memory controller functions include error correction (ECC), wear leveling, bad block mapping, read scrubbing and read disturb management, read and write caching, garbage collection, and encryption.

In addition, the hybrid control module (192) also includes computer program instructions that when executed by the processor (156) cause the hybrid controller (108) to carry out the steps of: receiving from the external source (130), by the hybrid controller (108), a first command (120) at the first external interface (112) and a second command (122) at the second external interface (114); and concurrently implementing, by the hybrid controller (108), the first command (120) using a PCIe protocol (198) and the second command (122) using one of a SAS protocol (194) and a SATA protocol (196). That is, the hybrid controller (108) may process commands using two different protocols.

For example, the first command (120) may comprise a PCIe I/O command and the second command (122) may comprise a management command. The hybrid controller (108) may use the PCIe protocol to process the PCIe I/O command and use one of the SATA protocol and the SAS protocol to process the management command. In this example, processing the PCIe I/O command may include reading and writing data to and from the solid state memory chips (104) and processing the management command may include retrieving and writing management data within management data registers (199) in the hybrid controller (108). In the example of FIG. 1, the management data registers (199) store management data (197) corresponding to the solid state memory (104). Examples of management data include a number of lifetime writes to the storage device; average write amplification; and the number of cells within the memory chips that have been marked as damaged.

Figure 2:
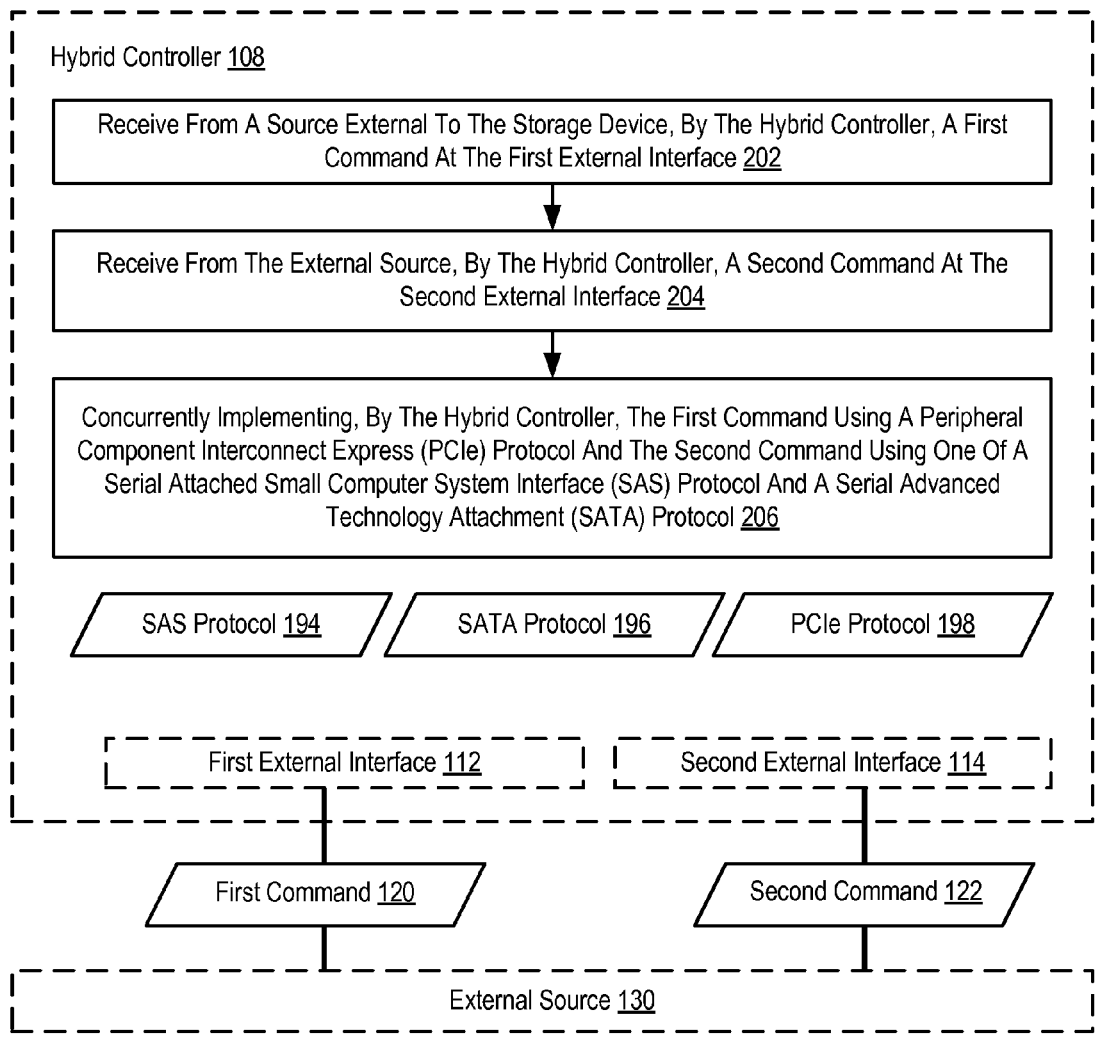
FIG. 2 sets forth a flow chart illustrating an exemplary method for managing a storage device using a hybrid controller according to embodiments of the present invention.
Figure 3:
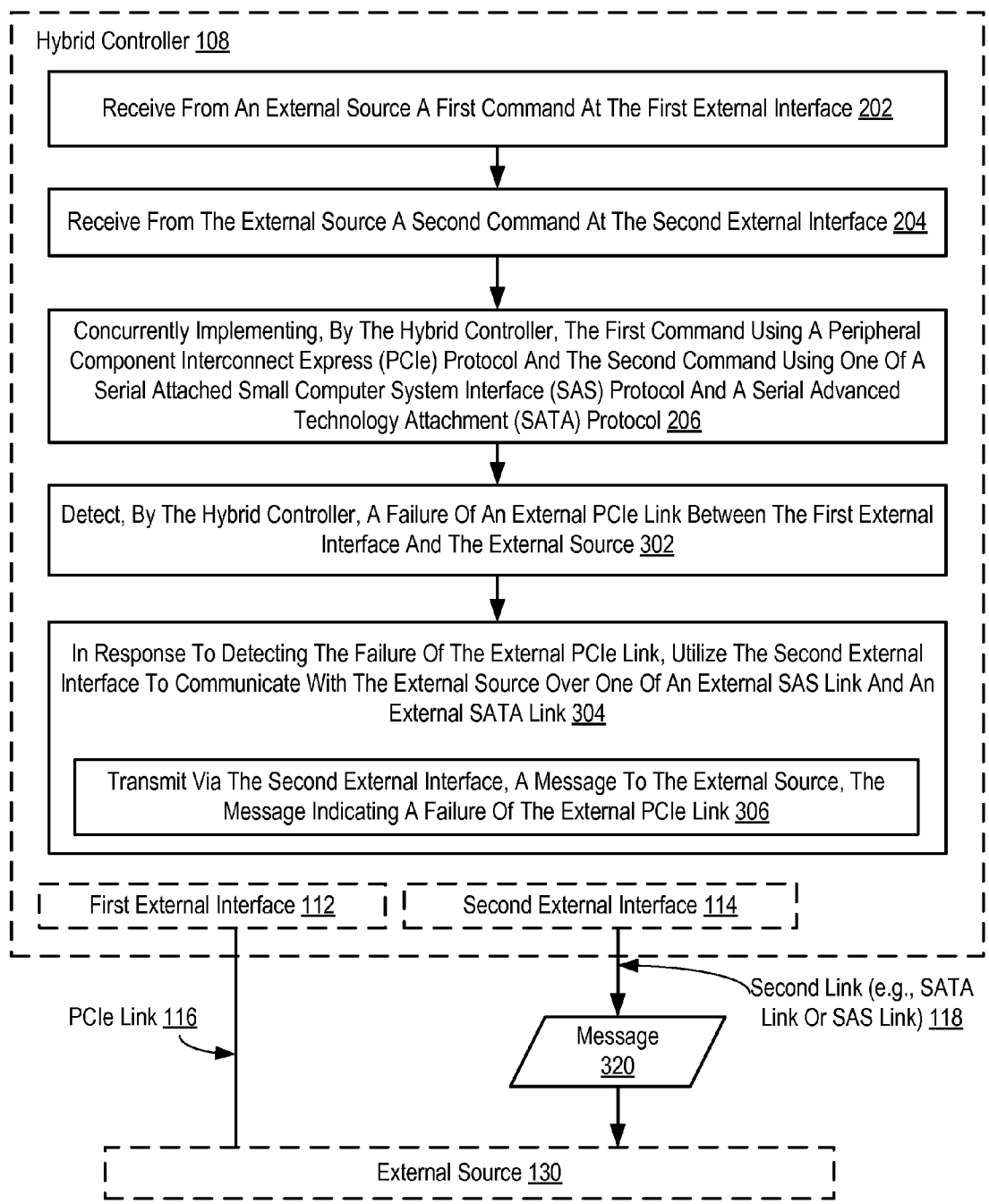
FIG. 3 sets forth a flow chart illustrating a further exemplary method for managing a storage device using a hybrid controller according to embodiments of the present invention.
Figure 4:
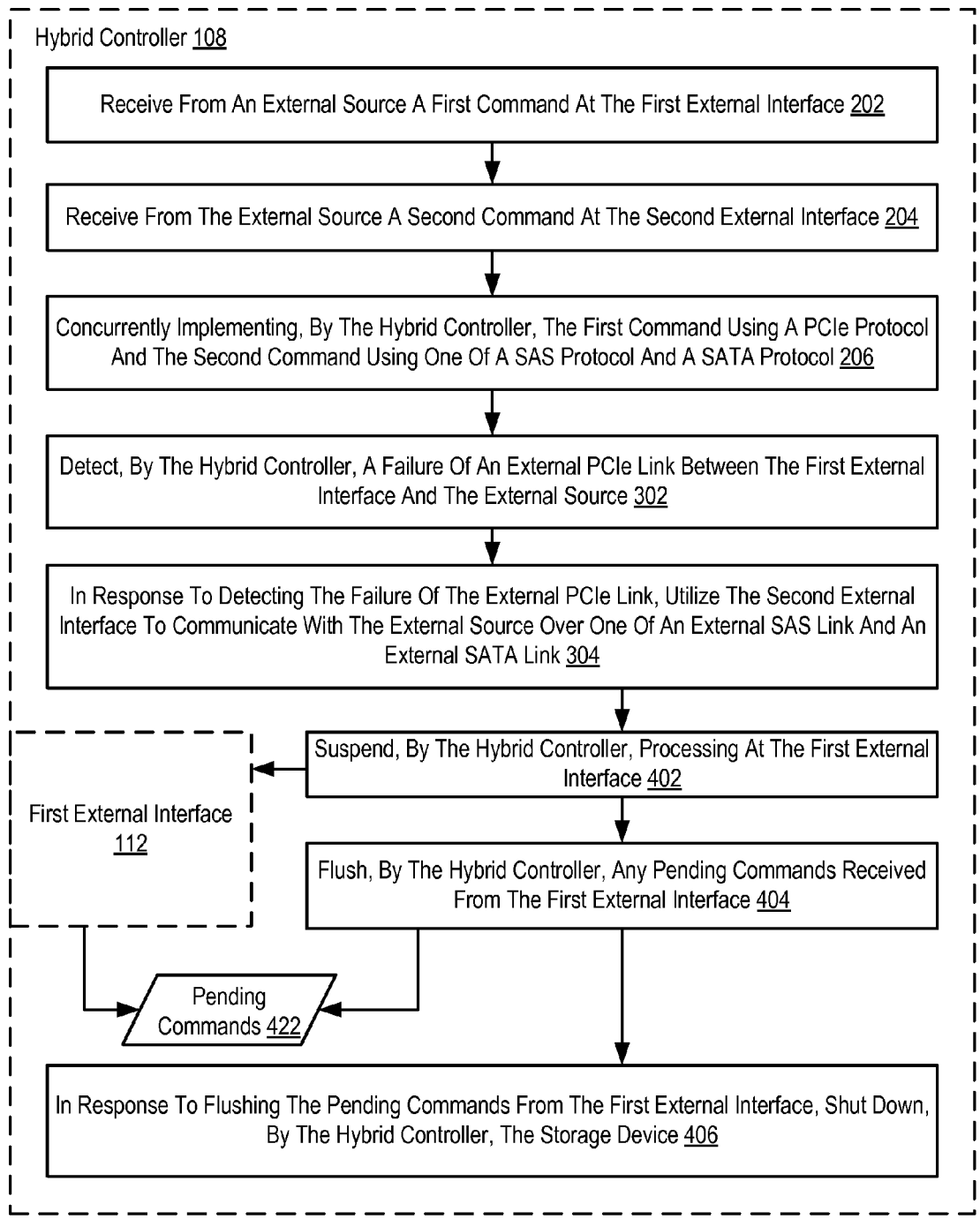
FIG. 4 sets forth a flow chart illustrating a further exemplary method for managing a storage device using a hybrid controller according to embodiments of the present invention.
Figure 5:
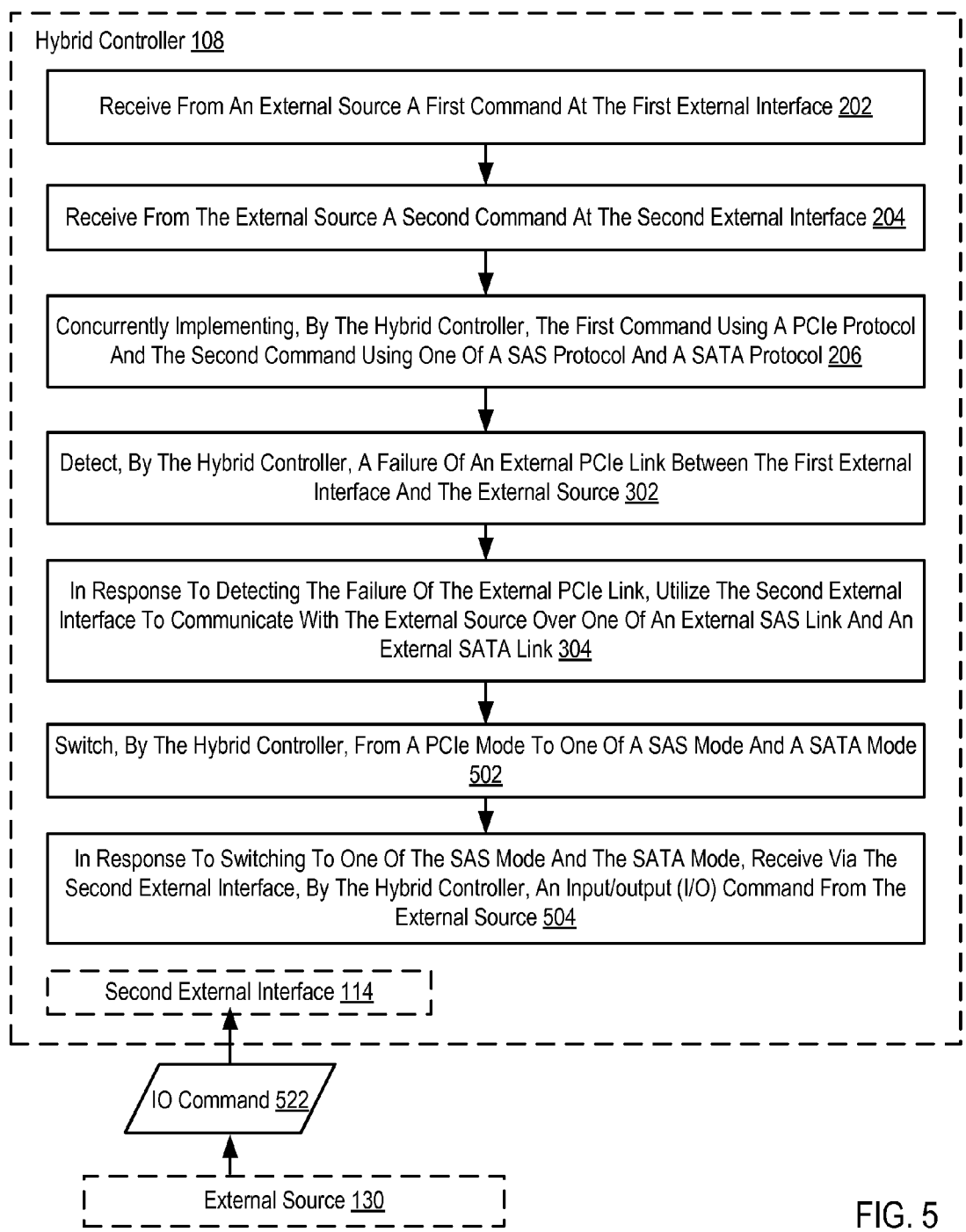
FIG. 5 sets forth a flow chart illustrating a further exemplary method for managing a storage device using a hybrid controller according to embodiments of the present invention.

Having two external interfaces the utilize different protocols allows the hybrid controller (108) to process I/O management commands and management commands concurrently, as explained in FIG. 2; notify an external source of a first link failure via a second link, as further explained in FIG. 3; perform a graceful shutdown of the storage device in response to a failure of a link, as further explained in FIG. 4; and switching between two protocol modes, as explained in FIG. 5.

For further explanation, FIG. 2 sets forth a flow chart illustrating an exemplary method for managing a storage device using a hybrid controller (108) according to embodiments of the present invention. The method of FIG. 2 includes receiving (202) from a source (130) external to the storage device (102), by the hybrid controller (108), a first command (120) at the first external interface (112). Receiving (202) from a source (130) external to the storage device (102), by the hybrid controller (108), a first command (120) at the first external interface (112) may be carried out by receiving a PCIe input/output command for accessing data or writing data to the solid state memory chips.

The method of FIG. 2 includes receiving (204) from the external source (130), by the hybrid controller (108), a second command (122) at the second external interface (114). Receiving (204) from the external source (130), by the hybrid controller (108), a second command (122) at the second external interface (114) may be carried out by receiving a SAS management command or a SATA management command for accessing management data corresponding to the solid state memory chips. Examples of management data include a number of lifetime writes to the storage device; average write amplification; and the number of cells within the memory chips that have been marked as damaged.

The method of FIG. 2 includes concurrently implementing (206), by the hybrid controller (108), the first command (120) using a PCIe protocol (198) and the second command (122) using one of a SAS protocol (194) and a SATA protocol (196). Concurrently implementing (206), by the hybrid controller (108), the first command (120) using a PCIe protocol (198) and the second command (122) using one of a SAS protocol (194) and a SATA protocol (196) may be carried out by accessing data stored on the memory chips in response to receiving a PCIe command and accessing management data stored in management data registers in the hybrid controller in response to receiving a SAS command or SATA command. That is, the hybrid controller (108) may be configured to process commands using two protocols at the same time.

For further explanation, FIG. 3 sets forth a flow chart illustrating a further exemplary method for managing a storage device using a hybrid controller according to embodiments of the present invention. The method of FIG. 3 is similar to the method of FIG. 2 in that the method of FIG. 3 also includes receiving (202) from a source (130) external to the storage device (102), a first command (120) at the first external interface (112); receiving (204) from the external source (130) a second command (122) at the second external interface (114); and concurrently implementing (206) the first command (120) using a PCIe protocol (198) and the second command (122) using one of a SAS protocol (194) and a SATA protocol (196).

The method of FIG. 3 also includes detecting (302), by the hybrid controller (108), a failure of an external PCIe link (116) between the first external interface (112) and the external source (130). Detecting (302), by the hybrid controller (108), a failure of an external PCIe link (116) between the first external interface (112) and the external source (130) may be carried out by receiving an indication from the first external interface. Examples of indications may include a time out; bad data; and indications of bad or corrupted data.

The method of FIG. 3 also includes in response to detecting the failure of the external PCIe link (116), utilizing the second external interface (114) to communicate with the external source (130) over one of an external SAS link (118) and an external SATA link (118). Utilizing the second external interface (114) to communicate with the external source (130) over one of an external SAS link (118) and an external SATA link (118) may be carried out by shifting communications and commands that would be sent via the first external interface to the second external interface.

In the example of FIG. 3, utilizing the second external interface (114) to communicate with the external source (130) over one of an external SAS link (118) and an external SATA link (118) optionally includes transmitting (306) via the second external interface (114), a message (320) to the external source (130). In the example of FIG. 3, the message indicates a failure of the external PCIe link (116). Transmitting (306) via the second external interface (114), a message (320) to the external source (130) may be carried out by placing failure notification data within a message; and transmitting the message.

For further explanation, FIG. 4 sets forth a flow chart illustrating a further exemplary method for managing a storage device using a hybrid controller according to embodiments of the present invention. The method of FIG. 4 is similar to the method of FIG. 3 in that the method of FIG. 4 also includes receiving (202) from a source (130) external to the storage device (102), a first command (120) at the first external interface (112); receiving (204) from the external source (130) a second command (122) at the second external interface (114); concurrently implementing (206) the first command (120) using a PCIe protocol (198) and the second command (122) using one of a SAS protocol (194) and a SATA protocol (196); detecting (302) a failure of an external PCIe link (116) between the first external interface (112) and the external source (130); and in response to detecting the failure of the external PCIe link (116), utilizing the second external interface (114) to communicate with the external source (130) over one of an external SAS link (118) and an external SATA link (118).

The method of FIG. 4 also includes suspending (402), by the hybrid controller (108), processing at the first external interface (112). Suspending (402), by the hybrid controller (108), processing at the first external interface (112) may be carried out by preventing transmission or reception of commands or data at the first external interface.

The method of FIG. 4 also includes flushing (404), by the hybrid controller (108), any pending commands (422) received from the first external interface (112). Flushing (404), by the hybrid controller (108), any pending commands (422) received from the first external interface (112) may be carried out by identifying the pending commands; and discarding the pending commands.

The method of FIG. 4 also includes in response to flushing the pending commands (422) from the first external interface (112), shutting down (406), by the hybrid controller (108), the storage device (102). Shutting down (406), by the hybrid controller (108), the storage device (102) may be carried out by performing a shut down procedure that includes turning one or more components of the storage device off.

For further explanation, FIG. 5 sets forth a flow chart illustrating a further exemplary method for managing a storage device using a hybrid controller according to embodiments of the present invention. The method of FIG. 4 is similar to the method of FIG. 3 in that the method of FIG. 4 also includes receiving (202) from a source (130) external to the storage device (102), a first command (120) at the first external interface (112); receiving (204) from the external source (130) a second command (122) at the second external interface (114); concurrently implementing (206) the first command (120) using a PCIe protocol (198) and the second command (122) using one of a SAS protocol (194) and a SATA protocol (196); detecting (302) a failure of an external PCIe link (116) between the first external interface (112) and the external source (130); and in response to detecting the failure of the external PCIe link (116), utilizing the second external interface (114) to communicate with the external source (130) over one of an external SAS link (118) and an external SATA link (118).

The method of FIG. 5 includes switching (502), by the hybrid controller (108), from a PCIe mode to one of a SAS mode and a SATA mode. In the PCIe mode, the hybrid controller (108) may act as a PCIe device while in the SAS mode or SATA mode, the hybrid controller (108) may act as a SAS device or a SATA device, respectively. For example, in the PCIe mode, the hybrid controller may only allow I/O commands in the PCIe protocol format whereas in the SATA mode, the hybrid controller may allow I/O commands in the SATA protocol format. Switching (502), by the hybrid controller (108), from a PCIe mode to one of a SAS mode and a SATA mode may be carried out by shutting down the first external interface.

The method of FIG. 5 includes in response to switching to one of the SAS mode and the SATA mode, receiving (504) via the second external interface (114), by the hybrid controller (108), an input/output (I/O) command (522) from the external source (130). Receiving (504) via the second external interface (114), by the hybrid controller (108), an input/output (I/O) command (522) from the external source (130) may be carried out by receiving an I/O command in the SAS protocol format or the SATA protocol format.

Exemplary embodiments of the present invention are described largely in the context of a fully functional computer system for managing a storage device using a hybrid controller. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by computer program instructions on a hybrid controller of a storage device,
   detecting a failure of an external PCIe link between a source external to the storage device and a first external interface configured to establish an external PCIe link to the external source; and
   in response to detecting the failure of the external PCIe link:
   utilizing a second external interface to communicate with the external source over one of an external SAS link and an external SATA link;
   suspending processing at the first external interface;
   flushing any pending commands received from the first external interface; and
   in response to flushing the pending commands from the first external interface, shutting down the storage device.

2. The method of claim 1 further comprising by computer program instructions on the hybrid controller of the storage device,
   receiving from the external source, a first command at the first external interface;
   receiving from the external source, a second command at the second external interface; and
   concurrently implementing the first command using a PCIe protocol and the second command using one of a SAS protocol and a SATA protocol; wherein
   the first command comprises a PCIe I/O command; and
   the second command comprises a management command to access management data registers in the hybrid controller, the management data registers storing management data corresponding to the solid state memory.

3. The method of claim 1 wherein utilizing the second external interface to communicate with the external source over one of an external SAS link and an external SATA link includes transmitting via the second external interface, a message to the external source, the message indicating a failure of the external PCIe link.

4. An apparatus comprising an internal peripheral component interconnect express (PCIe) interface to control solid state memory within a storage device, the storage device including a hybrid controller, a first external interface and a second external interface, the first external interface configured to establish an external PCIe link, the second external interface configured to establish at least one of an external serial attached small computer system interface (SAS) link and an external serial advanced technology attachment (SATA) link, the hybrid controller comprising a computer processor and a computer memory operatively coupled to the computer processor, the hybrid controller configured to:
  detect a failure of the external PCIe link; and
  in response to detecting the failure of the external PCIe link:
    utilize the second external interface to communicate with the external source over one of the external SAS link and the external SATA link;
    suspend processing at the first external interface;
    flush any pending commands received from the first external interface; and
    in response to flushing the pending commands from the first external interface, shut down the storage device.

5. The apparatus of claim 4 wherein the hybrid controller is further configured to:
  receive from the external source, a first command at the first external interface;
  receive from the external source, a second command at the second external interface; and
  concurrently implement the first command using a PCIe protocol and the second command using one of a SAS protocol and a SATA protocol; wherein
  the first command comprises a PCIe I/O command; and
  the second command comprises a management command to access management data registers in the hybrid controller, the management data registers storing management data corresponding to the solid state memory.

6. The apparatus of claim 4 wherein utilizing the second external interface to communicate with the external source over one of an external SAS link and an external SATA link includes transmitting via the second external interface, a message to the external source, the message indicating a failure of the external PCIe link.

7. A computer program product comprising a non-transitory computer readable medium, the computer readable medium including computer program instructions that when executed by a hybrid controller of a storage device cause the hybrid controller to carry out the steps of:
  detecting a failure of an external PCIe link between a source external to the storage device and a first external interface configured to establish an external PCIe link to the external source; and
  in response to detecting the failure of the external PCIe link:
    utilizing a second external interface to communicate with the external source over one of an external SAS link and an external SATA link;
    suspending processing at the first external interface;
    flushing any pending commands received from the first external interface; and
    in response to flushing the pending commands from the first external interface, shutting down the storage device.

8. The computer program product of claim 7 the computer readable medium including computer program instructions that when executed by a hybrid controller of a storage device cause the hybrid controller to carry out the steps of:
  receiving from the external source, a first command at the first external interface;
  receiving from the external source, a second command at the second external interface; and
  concurrently implementing the first command using a PCIe protocol and the second command using one of a SAS protocol and a SATA protocol; wherein
  the first command comprises a PCIe I/O command; and
  the second command comprises a management command to access management data registers in the hybrid controller, the management data registers storing management data corresponding to the solid state memory.

9. The computer program product of claim 7 wherein utilizing the second external interface to communicate with the external source over one of an external SAS link and an external SATA link includes transmitting via the second external interface, a message to the external source, the message indicating a failure of the external PCIe link.

10. The computer program product of claim 7 wherein the computer readable medium comprises a storage medium.

* * * * *